US010124997B2

(12) United States Patent
Jaipaul

(10) Patent No.: US 10,124,997 B2
(45) Date of Patent: Nov. 13, 2018

(54) REMOTE LIFT CONTROL USING INDEPENDENT COMPUTING DEVICES

(71) Applicant: Gray Manufacturing Company, Inc., St. Joseph, MO (US)

(72) Inventor: Larry M. Jaipaul, Clarence, NY (US)

(73) Assignee: Gray Manufacturing Company, Inc., St. Joseph, MO (US)

( * ) Notice: Subject to any disclaimer, the term of this patent is extended or adjusted under 35 U.S.C. 154(b) by 266 days.

(21) Appl. No.: 15/074,409

(22) Filed: Mar. 18, 2016

(65) Prior Publication Data

US 2016/0272471 A1 Sep. 22, 2016

Related U.S. Application Data

(60) Provisional application No. 62/134,819, filed on Mar. 18, 2015.

(51) Int. Cl.
*B66F 3/46* (2006.01)
*G05B 15/02* (2006.01)

(52) U.S. Cl.
CPC .................................... *B66F 3/46* (2013.01)

(58) Field of Classification Search
CPC .................................................. B66F 3/46
See application file for complete search history.

(56) References Cited

U.S. PATENT DOCUMENTS

| | | | | |
|---|---|---|---|---|
| 9,490,998 B1 * | 11/2016 | Danciu | ............... | H04L 12/2818 |
| 2013/0096701 A1 * | 4/2013 | Suorajaervi | ............ | A61G 13/02 700/83 |
| 2013/0240300 A1 * | 9/2013 | Fagan | ....................... | B66F 3/46 187/210 |
| 2014/0067094 A1 * | 3/2014 | Park | ....................... | G05B 15/02 700/90 |

OTHER PUBLICATIONS

ARI-HETRA 2011 Catalog, Published Apr. 30, 2011, 92 pages, Automotive Resources, Inc., Manassas, VA.

* cited by examiner

*Primary Examiner* — Yuhui R Pan
(74) *Attorney, Agent, or Firm* — Hovey Williams LLP

(57) ABSTRACT

A remote control system for remotely controlling a vehicle lift. The remote control system may comprise a lift control module and a remote computing device. The lift control module may be configured to receive information indicative of an instruction to pair the lift control module with a computing device and to present a validation code. The remote computing device may be configured to receive information indicative of an instruction to pair the remote computing device with the lift control module and to receive the validation code presented by the lift control module. Upon validating the received validation code, the remote computing device may be configured to be paired with the lift control module.

19 Claims, 9 Drawing Sheets

REMOTE LIFT CONTROL USING INDEPENDENT COMPUTING DEVICES

RELATED APPLICATION

This non-provisional patent application claims priority to U.S. Provisional Patent Application Ser. No. 62/134,819, filed on Mar. 18, 2015, and entitled "WIRELESS LIFT CONTROL USING INDEPENDENT COMPUTING DEVICES," the entire disclosure of which is incorporated by reference into this non-provisional patent application.

FIELD

Embodiments of the present invention are directed to a remote control for a vehicle lift system. More particularly, embodiments of the present invention are directed to a remote control for remotely operating, in a safe manner, one or more lifts of a vehicle lift system.

BACKGROUND

The need to lift a vehicle from the ground for service work is well established. For instance, it is often necessary to lift a vehicle for tire rotation or replacement, steering alignment, oil changes, brake inspections, exhaust work, and other automotive maintenance. Traditionally, lifting a vehicle has been accomplished through the use of equipment that is built-in to a service facility, such as either lift units with hydraulic actuator(s) installed below the surface of the floor or two and four post type lift systems installed on the floor surface.

In an effort to increase the versatility and mobility of lift devices and reduce the need to invest in permanently mounted lifting equipment, devices commonly known as a mobile column lifts (MCL's) have been developed. An apparatus for lifting a vehicle using multiple MCL's is described in U.S. Pat. No. 6,315,079 to Berends et al. Another apparatus for lifting a vehicle using multiple MCL's is described in U.S. Pat. No. 6,634,461, the entire disclosures of which are incorporated herein by reference.

Prior MCL systems, such as those indicated above, generally permit operators to control the operation of the lifts only via the lifts' integral control components, which are incorporated directly within or on the lifts. As such, operators must be, at all times, positioned adjacent to the lifts when operating the lifts. Such a restriction on the operator's positioning may prohibit the operators from performing certain other necessary functions. For instance, an operator may be required to visually inspect a vehicle (or the surrounding environment), as the vehicle is being lifted by the MCL system. However, the operator cannot accomplish such inspection if the operator is required to remain positioned near the lifts during lifting operations. In addition, the operator may be required to perform other tasks while simultaneously operating the lift. Nevertheless, the operator may not be able to accomplish such tasks if the operator is required to remain positioned near the lift. Furthermore, in instances where the lifts' integral control components are non-functioning (i.e., due to component failure, damage, or the like), the operators may be completely unable to operate the lifts.

Accordingly, there remains a need for a remote control for remotely operating lifts of a vehicle lift system in a safe manner. In particular, there is a need for a remote control that is separate from the integral control components of the lifts of a lift system.

SUMMARY

Once embodiment of the present invention may include a remote control system for remotely controlling one or more vehicle lifts. The remote control system may comprise a lift control module associated with the one or more vehicle lifts and a remote computing device. The lift control module may include a graphic display configured to present a graphical user interface (GUI), a processor, and a non-transitory computer-readable storage medium with a computer program stored thereon. The computer program may be configured to instruct the lift control module processor to receive information indicative of an instruction to pair the lift control module with a computing device and to present, via the lift control module GUI, a validation code. The remote computing device may include a graphic display configured to display a GUI, a processor, and a non-transitory computer-readable storage medium with a computer program stored thereon. The computer program may be configured to instruct the remote computing device processor to receive information indicative of an instruction to pair the remote computing device with the lift control module and to receive the validation code presented by the lift control module. Upon validating the received validation code, the remote computing device may be configured to be paired with the lift control module.

An additional embodiment of the present invention includes a method for remotely controlling a vehicle lift. The method may comprise the initial step of providing an instruction to a lift control module to pair with a remote computing device. An additional step may include providing an instruction to the remote computing device to pair with the lift control module. An additional step may include capturing a validation code with the remote computing device. An additional step may include providing an instruction to the remote computing device to enable remote control of the vehicle lift. A further step may include controlling the vehicle lift with the remote computing device.

A further embodiment of the present invention includes a non-transitory computer readable storage medium with a computer program stored thereon for controlling a vehicle lift. The computer program may configured to instruct a processor to perform the steps indicated below. An initial step may include receiving an instruction to pair with the vehicle lift. An additional step may include obtaining a validation code. An additional step may include pairing with the vehicle lift by creating a communications link with the vehicle lift. An additional step may include receiving an instruction to enable remote operation of the vehicle lift. An additional step may include determining if a confirmation period elapses without receiving the instruction to enable remote operation of the vehicle lift. Upon determining that the confirmation period has elapsed without receiving the instruction to enable remote operation of the vehicle lift, a further step may include disabling the communications link with the vehicle lift.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
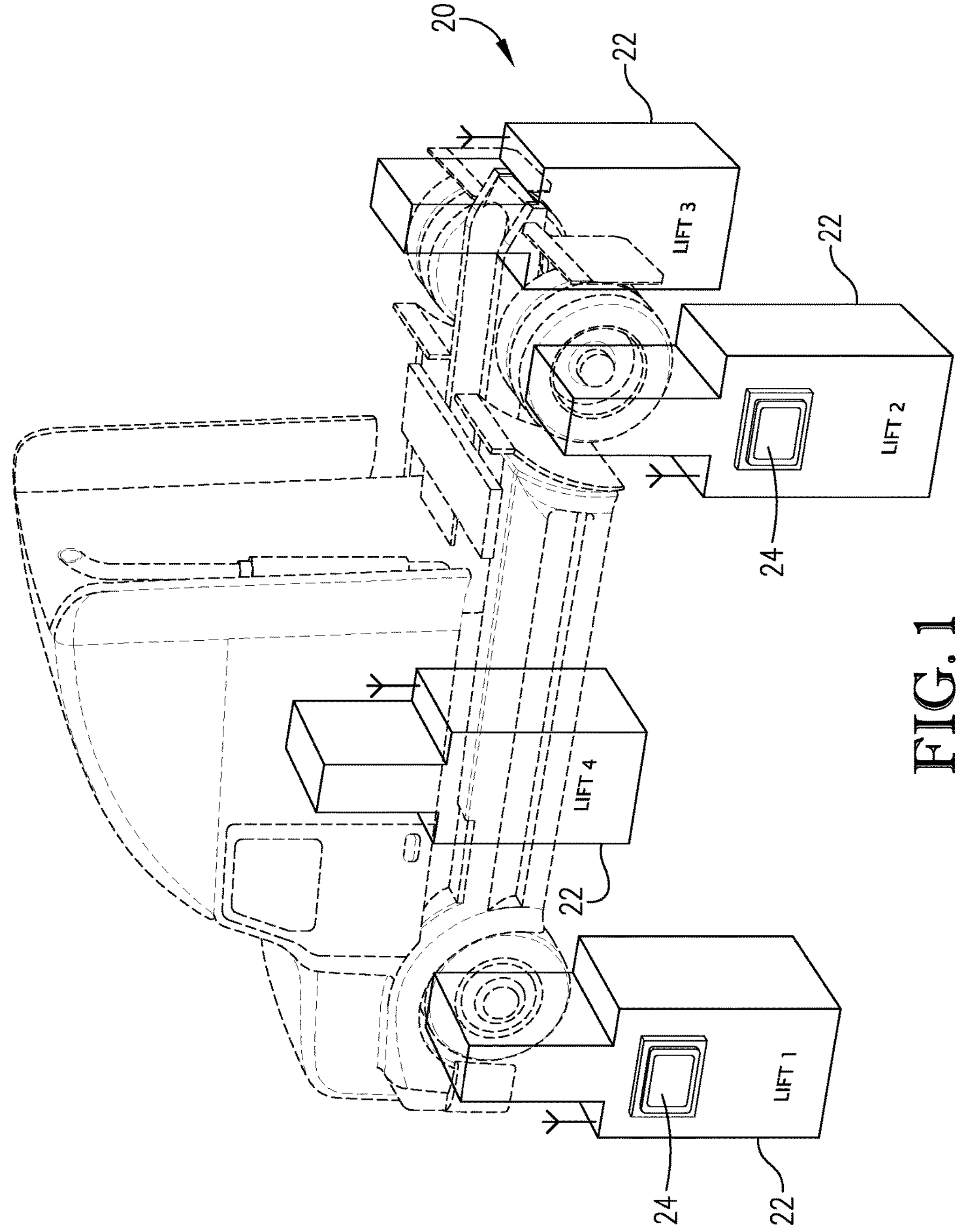
FIG. 1 is a simplified representation of a lift system utilizing four individual lifts to lift a vehicle, where one or more of the lifts is equipped with a lift control module.
Figure 3A:
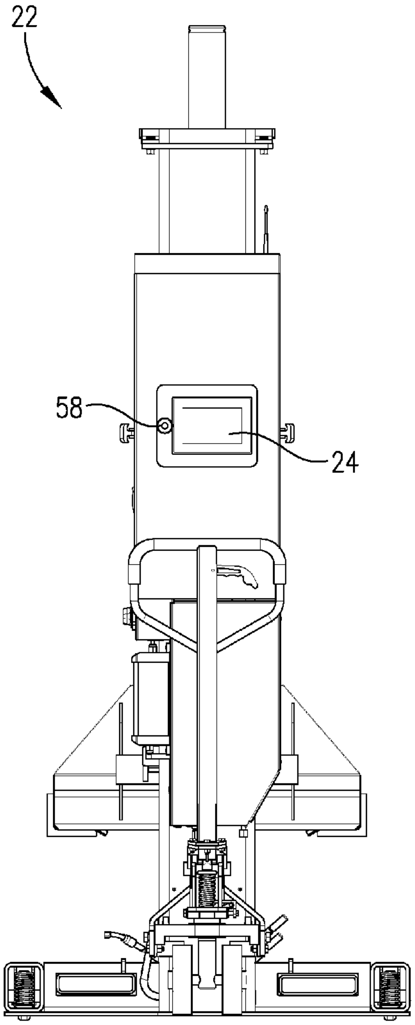
Figure 3B:
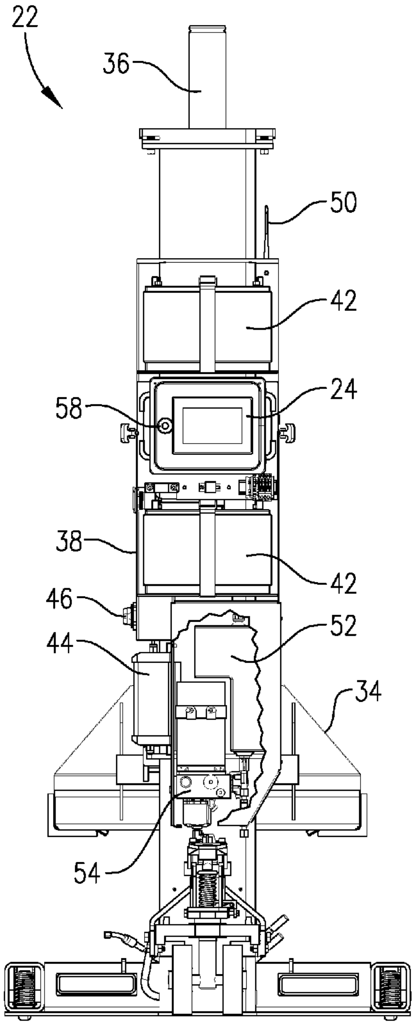
Figure 4:
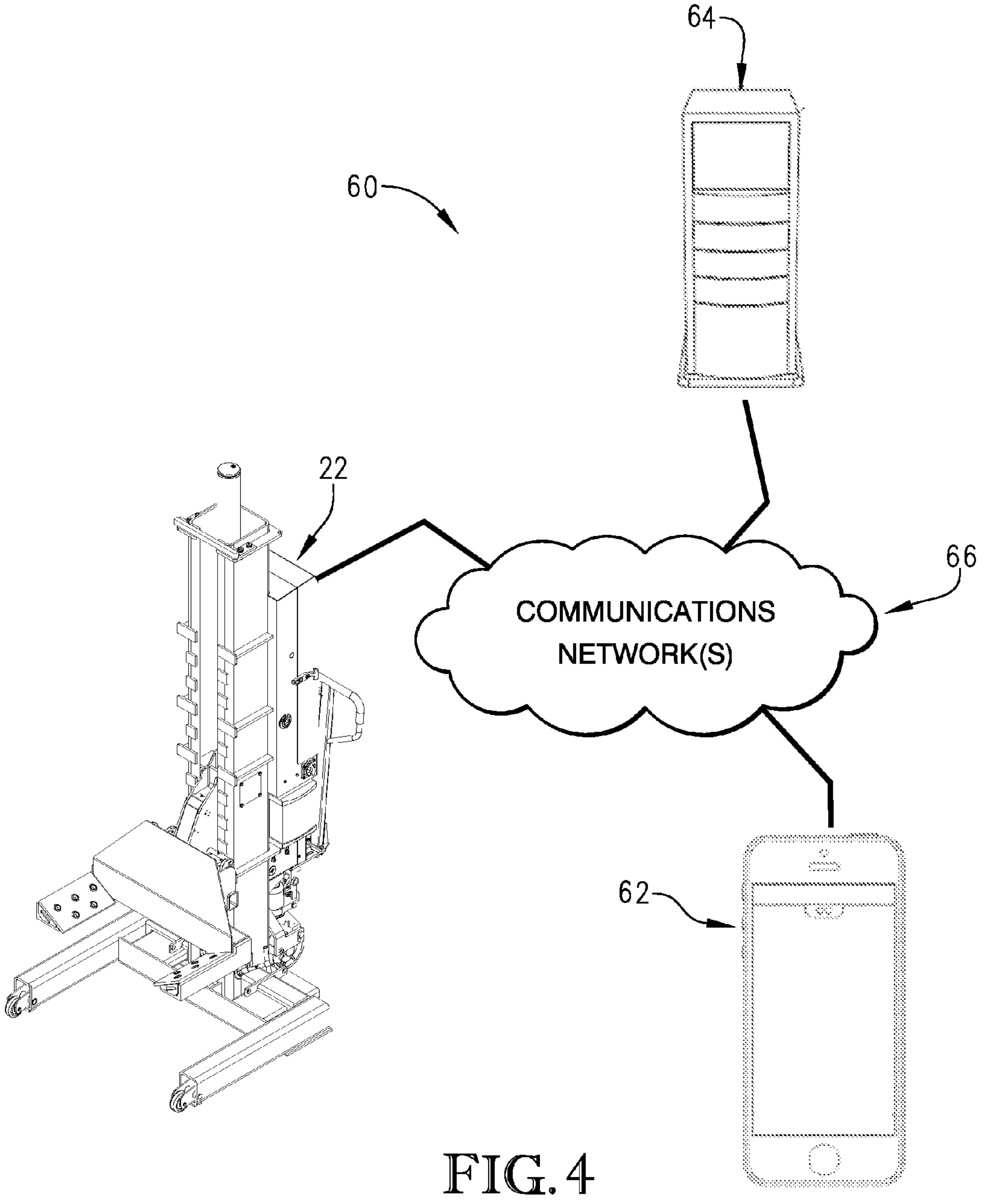
Figure 5:
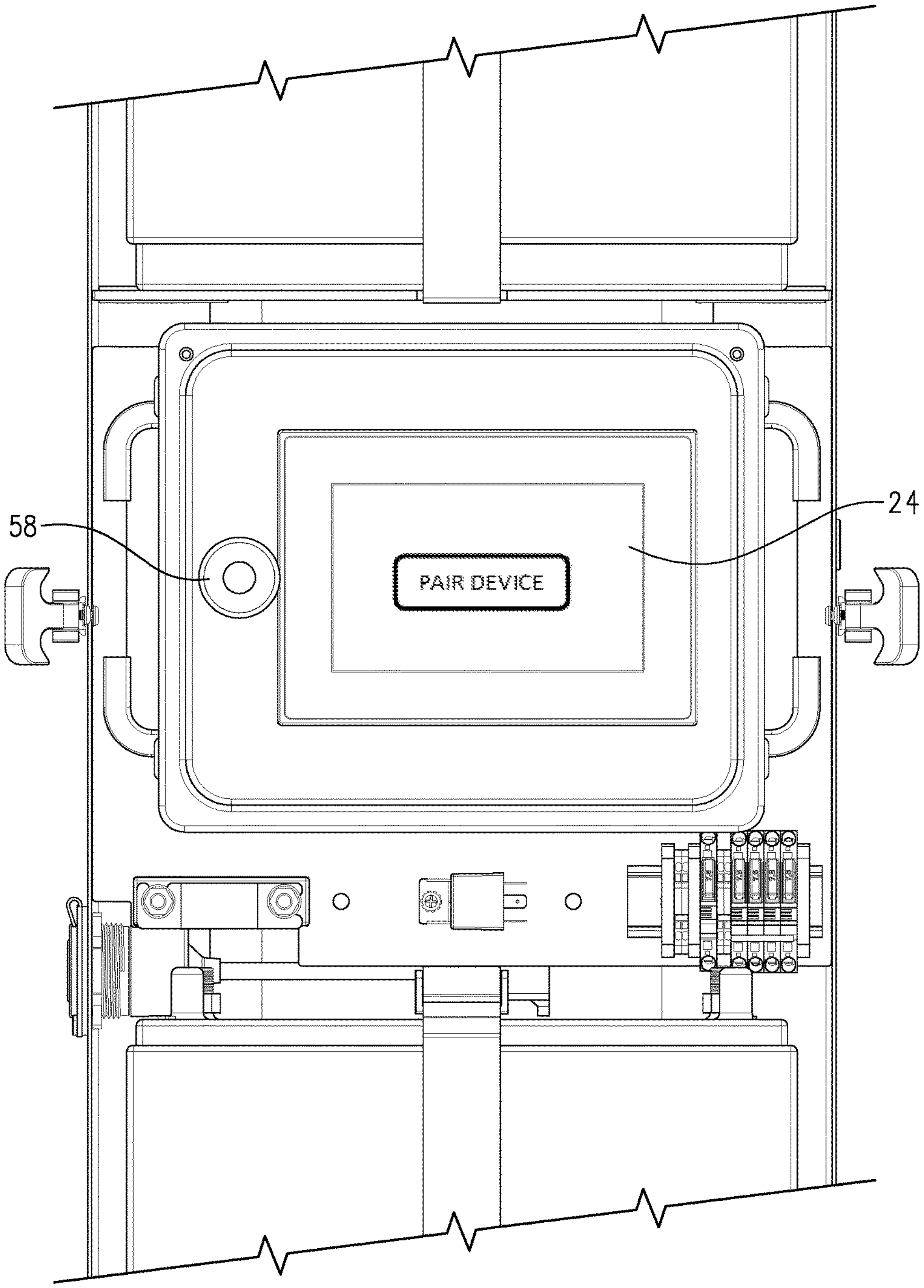
Figure 6:
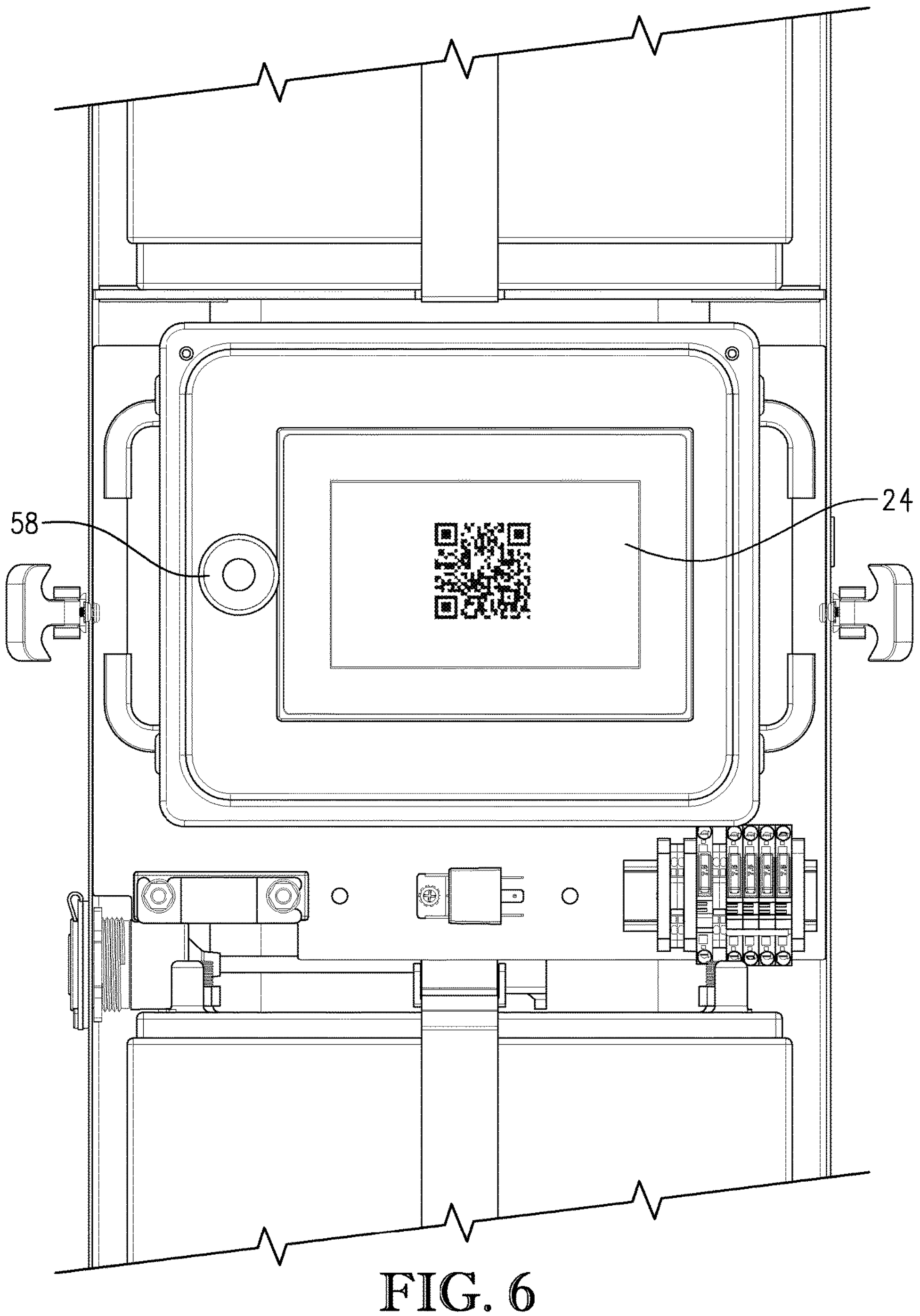
Figure 7:
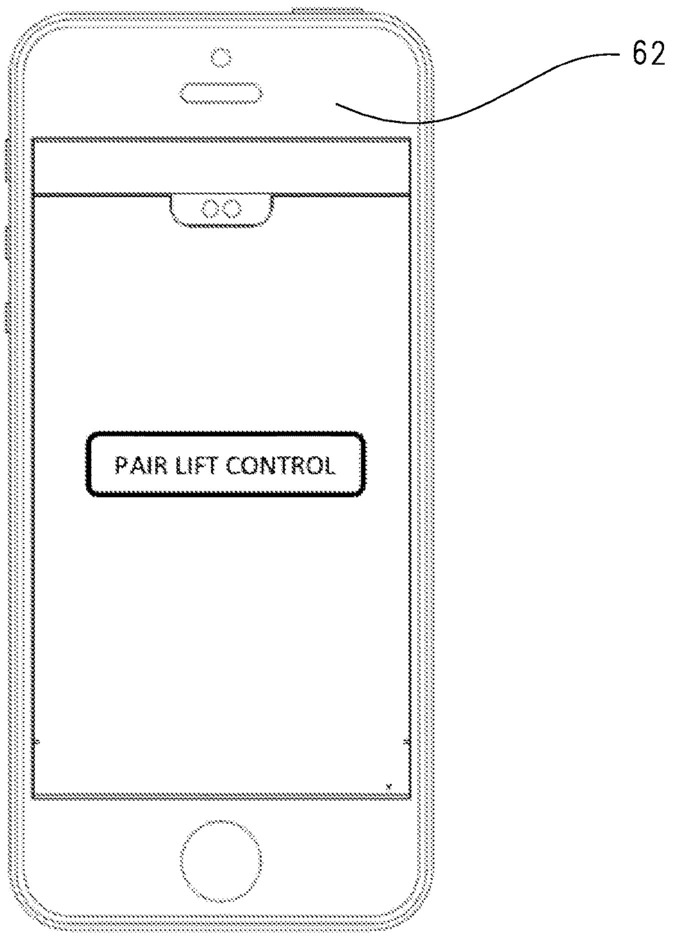
Figure 8:
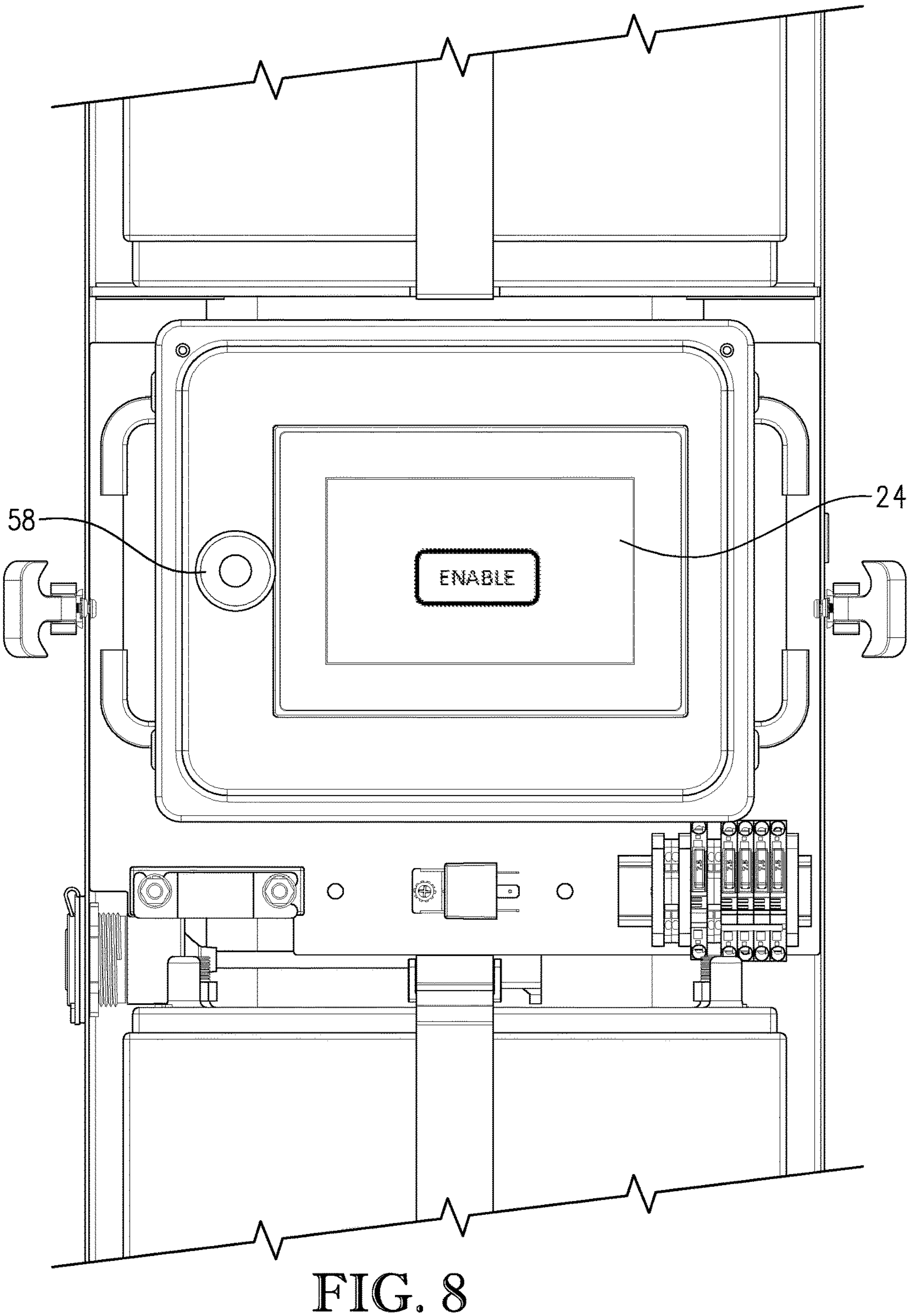
Figure 9:
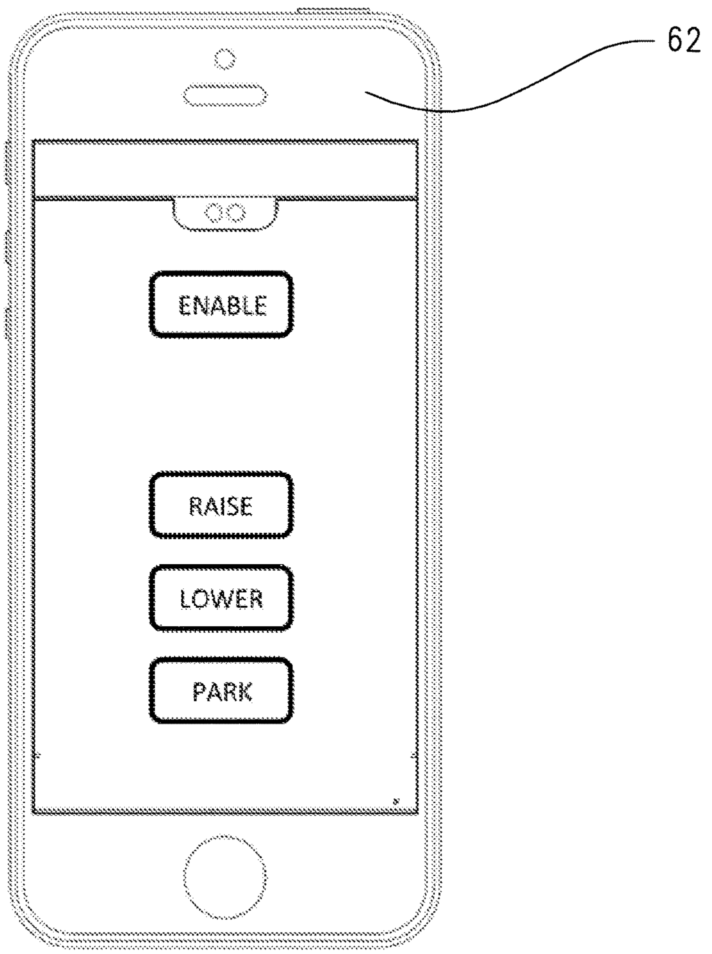

FIG. 3*a* is a back elevation view of the wireless portable lift of FIG. 1;

FIG. 3*b* is a back elevation view of the wireless portable lift of FIG. 1, with certain portions of a main housing being removed or cut away to show individual components of the lift's electrical power system, lift control system, and hydraulic power system;

FIG. 4 is a schematic depiction of a remote control system according to embodiments of the present invention;

FIG. 5 is a depiction of a graphical user interface on a lift control module of a lift presenting a "Pair Device" button/icon;

FIG. 6 is a depiction of a graphical user interface on a lift control module of a lift presenting a validation code;

FIG. 7 is a depiction of a graphical user interface on a remote computing device presenting a "Pair Lift Control" button/icon;

FIG. 8 is a depiction of a graphical user interface on a lift control module of a lift presenting an "Enable" button/icon; and FIG. 9 is a depiction of a graphical user interface on a remote computing device presenting an "Enable" button/icon and a plurality of command button/icons.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Lift System

The present invention provides various embodiments of a computer program, a method, and a system for remotely controlling one or more vehicle lifts of a vehicle lift system. Referring to FIG. 1, numeral 20 generally designates a vehicle lift system having four individual lifts 22. The vehicle lift system 20 is similar, in certain respects, to the vehicle lift system described in U.S. Patent App. Publ. No. 2013/0240300, filed on Mar. 15, 2013, which is herein incorporated by reference in its entirety. Although FIG. 1 depicts a four lift 22 system, it should be understood that any combination of one or more lifts 22 may be used. For example, the lift system 20 may employ two, four, six, eight, or generally any number of individual lifts 22, as may be required. In certain embodiments, each of the lifts 22 may be substantially identical. It should also be understood that the lift system 20 is not necessarily limited for use with vehicles, but also may be used to raise or lower other objects relative to a floor or ground surface, such as aircraft, industrial machinery, shipping containers, construction subassemblies, and the like.

As shown in FIG. 1, each of the individual lifts 22 of the lift system 20 may be equipped with a lift control module 24 that is operable to perform independent functions as well as to control the functionality of any one or more of the lifts 22 of the system 20. In other embodiments, the lift system 20 may only include a single lift control module 24 that is operable to perform independent functions as well as to control each of the lifts 22.

In certain embodiments of the present invention, the lift control module 24 may include any type of computing device, such as any computing device, component, or equipment with one or more processors and/or associated memory elements. For instance, the lift control module 24 may comprise a work station, a desktop computer, a laptop computer, a palmtop computer, a tablet, and the like, or combinations thereof. The processor of the lift control module 24 may implement operating systems, and may generally be capable of executing computer programs, which are also commonly known as instructions, commands, software code, executables, applications, apps, and the like. The processors may include multiple processors, microprocessors, microcontrollers, field programmable gate arrays, and the like, or combinations thereof. The memory elements may be capable of storing or retaining computer programs, and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, memory cards, optical storage media such as compact discs (CDs or CDROMs), digital video disc (DVD), Blu-ray™, and the like, or combinations thereof.

In some embodiments, the lift control module 24 may include a graphic display, such as a liquid crystal display, plasma, or touch screen (e.g., a capacitive digitizer, a resistive digitizer, or the like) that is operable to display visual graphics, images, text, etc. In certain embodiments, the lift control module 24 may be configured to present a graphical user interface (GUI) that is displayed via the graphic display. The GUI can enable users to interact with the lift control module 24 by touching or pointing at display areas on the graphic display to thereby provide information and commands to the lift control module 24.

Furthermore, the lift control module 24 may include other user control interface components, which enable users to share information and commands with the lift control module 24. In some embodiments, the user control interface may simply include the GUI. In other embodiments, the user control interface may comprise one or more functionable inputs such as buttons, keyboard, switches, scrolls wheels, voice recognition elements such as a microphone, pointing devices such as mice, touchpads, tracking balls, and styluses. The user control interface may also include a speaker for providing audible instructions and feedback. Further, the user control interface may comprise wired or wireless data transfer elements, such as a communication component, removable memory, data transceivers, and/or transmitters, to enable the user and/or other computing devices to remotely interface with the lift control module 24.

The lift control module 24 may communicate with the lifts 22 or with other computing devices through a communications network, which may comprise various networks, including wired or wireless networks. The communications network may including servers, routers, switches, wireless receivers and transmitters, and the like, as well as electrically conductive cables (e.g., serial cables) or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

Figure 2:
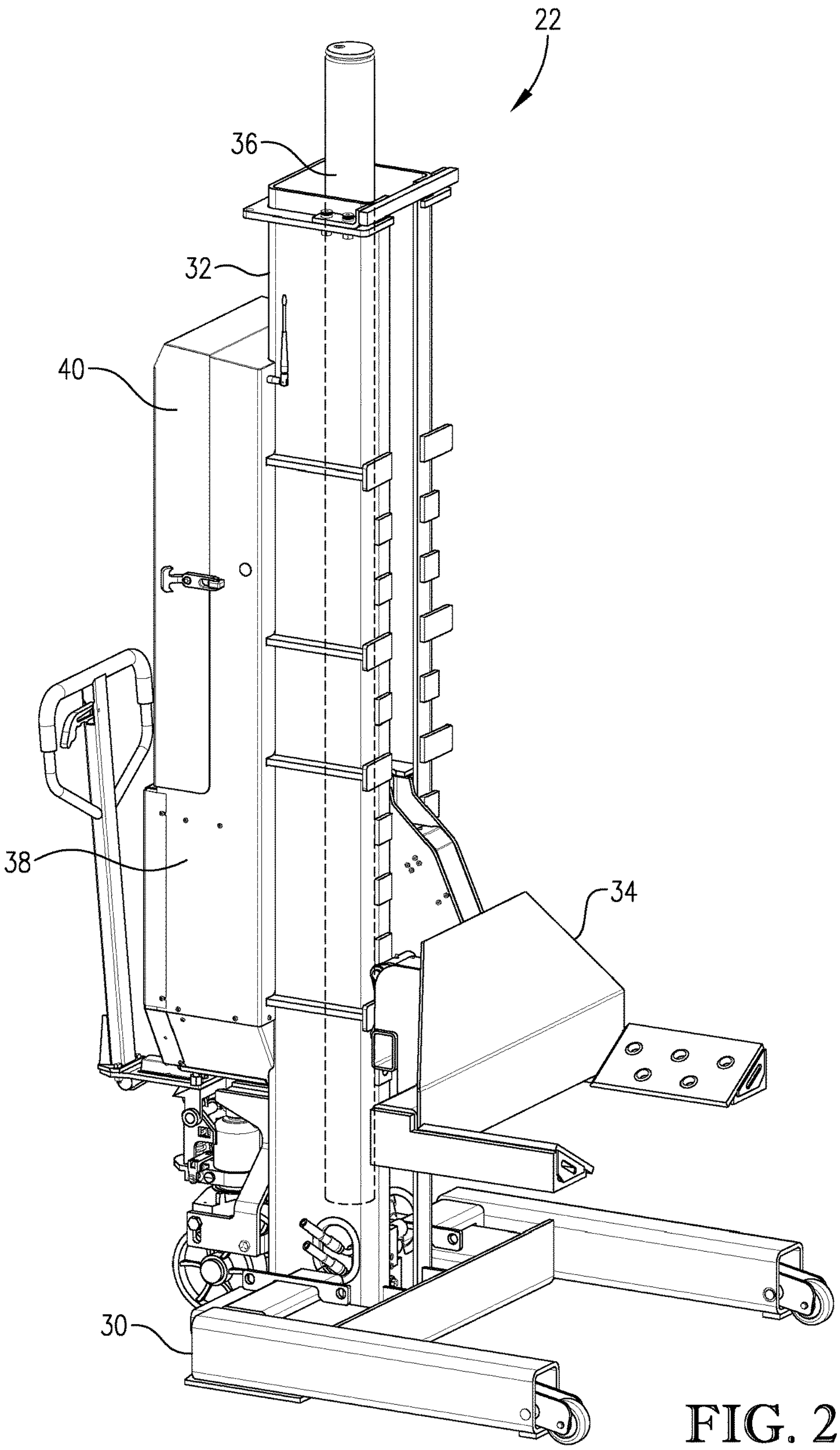
FIG. 2 is a perspective view showing the front and side of a lift configured in accordance with certain embodiments of the present invention.

Turning now to FIG. 2, a lift 22 configured in accordance with one or more embodiments of the present invention is illustrated. The lift 22 can include a base 30, a post 32, a carriage assembly 34, a lift actuator 36, and a main housing 38. The base 30 may be configured to support the lift on the floor or the ground. The post 32 may be rigidly coupled to the base 30 and can extend upwardly therefrom. The carriage assembly 34 may configured to engage the wheel of a vehicle and is vertically shiftable relative to the post 32. The lift actuator 36 may be received in the post 32 and is operable to vertically raise and lower the carriage assembly 34 relative to the post 32 and the base 30. The main housing 38 may be attached to the post 32 and is configured to enclose many of the components of that make up the lift control system and the power systems for the lift 22. The main housing 38 may include a removable access panel 40 for providing access to various components of the control and power systems of the lift 22. FIGS. 3*a* and 3*b* provide views of the back of the lift 22. FIG. 3*b*, in particular, provides a view of the lift 22 with the access panel 40 being removed to show certain internal components located in an upper portion of the main housing 38. A lower portion of the main housing 38 is also cut away to show certain internal components located in a lower portion of the main housing 38.

In more detail, each of the lifts 22 may include an electrical power system, a lift control system, and a hydraulic power system. The electrical power system is configured to provide electrical power to the lift 22, and as illustrated in FIG. 3*b*, may include one or more rechargeable batteries 42, an electrical charger 44 for charging the batteries 42, and a main power switch 46. The lift may include an upper battery 42 and a lower battery 42, with each of the batteries comprising standard 12 Volt lead-acid batteries. The electrical charger 44 may comprise various electrical components, such as an AC-to-DC converter capable of converting an AC mains power to 12 Volt DC for charging the batteries 42. The main power switch 46 may selectively connect and disconnect the electrical components of the lift 22 from the batteries 42.

The lift control systems of the lifts 22 can control the functions and the intra/inter communications of the lifts 22. The lift control system of each lift 22 may include the lift control module 24 (previously described), one or more internal processors and/or memory elements, and an antenna 50. The internal processors of the lifts 22 may implement operating systems, and may generally be capable of executing computer programs, which are also commonly known as instructions, commands, software code, executables, applications, apps, and the like. The processors may include multiple processors, microprocessors, microcontrollers, field programmable gate arrays, and the like, or combinations thereof. The memory elements may be capable of storing or retaining computer programs, and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, memory cards, optical storage media such as compact discs (CDs or CDROMs), digital video disc (DVD), Blu-ray™, and the like, or combinations thereof. In certain embodiments, the lift control system for each lift 22 may comprise one two, three, four, five or six processors in each lift 22. In some specific embodiments, the internal processors may be in the form of Freescale HC12D60 processors. The antenna 50 of each lift 22 may comprise a transceiver capable of sending and receiving communications from the other lifts 22, from lift control modules 24, and/or from other computing devices.

The lift control system is configured to control the lifts 22 in response to operator (i.e., user) commands. Such commands may be provide for instance, via the lift control module 24. In other embodiments, such commands may also be provided via a remote computing device, as will be discussed in more detail below. Regardless, the lift control system may include a lift control processor and/or associated memory elements for processing information relating to and for controlling the components (e.g., sensors and actuators) of the lifts 22. However, in other embodiments, the lift control system of each of the lifts 22 may not include any processing elements, such that all processing required for operation of the lifts 22 is performed remotely (including, in some instances, remotely from the lift control modules 24).

The hydraulic power system of the lift 22 can be used to actuate the lift actuator 36 and, thus, the carriage assembly 34 of the lift 22 for purposes of raising and lowering a vehicle. The hydraulic power system can include a hydraulic reservoir 52 and a hydraulic pump 54. The hydraulic pump 54 may be configured to pump hydraulic fluid from the hydraulic reservoir 52 into engagement with the lift actuator 36 to raise the carriage assembly 34. An opposite procedure can be used to lower the lift 22. FIG. 3*b* further shows that, in some embodiments, each lift 22 may include an emergency stop (E-stop) switch 58, which may be used to halt operation of the lift 22 (e.g., lowering or raising) during an emergency.

Remote Control System

In addition to the components of the lift system 20 described above, embodiments of the present invention include a computer program, method, and system for remotely controlling the lifts 22 of the lift system 20. For instance, FIG. 4 illustrates a remote control system 60 for remotely controlling one or more lifts 22 of the lift system 20. The remote control system 60 may comprise, in addition to one or more lifts 22, a remote computing device 62, one or more server devices 64, and a communications network 66. As will be described in more detail below, the remote computing device 62 of the remote control system 60 can be configured to provide access to an application, a mobile application, or a website (collectively, the "computer program"), which allows a user to remotely control the lifts 22 of the lift system 20.

The remote computing device 62 may include any device, component, or equipment with a processing element and associated memory elements. The processing element may implement operating systems, and may be capable of executing the computer program, which is also generally known as instructions, commands, software code, executables, applications, apps, and the like. The processing element may include processors, microprocessors, micro-controllers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-ray™, and the like, or combinations thereof.

The remote computing device 62 may specifically include wireless mobile communication devices such as smartphones, tablets, laptop computers, palmtop computers, portable digital assistants (PDA), and the like, or combinations thereof. In preferred embodiments, the remote computing device 62 will have a graphic display, such as a liquid crystal display, plasma, or touch screen (e.g., a capacitive digitizer, a resistive digitizer, or the like) that is operable to display visual graphics, images, text, etc. In certain embodiments, the computer program of the present invention facilitates interaction and communication through a graphical user interface (GUI) that is displayed via the graphic display of the remote computing device 62. The GUI enables the user to interact with the remote computing device 62 by touching or pointing at display areas to provide information and commands to the remote computing device 62. In additional preferred embodiments, the remote computing device may include an optical device such as a digital camera, video camera, optical scanner, or the like, such that the remote computing device 62 can capture, store, and transmit digital images, and/or videos.

The remote computing device 62 may include a user control interface that enables one or more users to share information and commands with the remote computing device 62. In some embodiments, the user control interface may simply comprise the GUI (as previously described). In other embodiments, the user control interface may comprise one or more functionable inputs such as buttons, keyboard, switches, scrolls wheels, voice recognition elements such as a microphone, pointing devices such as mice, touchpads, tracking balls, styluses. The user control interface may also include a speaker for providing audible instructions and feedback. Further, the user control interface may comprise wired or wireless data transfer elements, such as a communication component, removable memory, data transceivers, and/or transmitters, to enable the user and/or other computing devices to remotely interface with the remote computing device 62.

The server device 64 may include may include any device, component, or equipment with a processing element and associated memory elements, such as computing devices that provide access to one or more general computing resources, such as data storage services, data transfer services, Internet services, and the like. The server device 64 may also provide access to a database that stores information related to the remote control system 60 of embodiments of the present invention. The database may store other information and data necessary for the implementation of the computer program, method, and embodiments of the present invention.

The communications network 66 may be wired or wireless and may include servers, routers, switches, wireless receivers and transmitters, and the like, as well as electrically conductive cables or optical cables. In certain specific embodiments, the communications network 66 may specifically comprise WiFi or Bluetooth networks. The communications network 66 may also include local, metro, or wide area networks, as well as the Internet, or other cloud networks. Furthermore, the communications network 66 may include cellular or mobile phone networks, as well as landline phone networks, public switched telephone networks, fiber optic networks, or the like. Each of the lifts 22, the remote computing devices 62, and the server device 64 may be connected via the communications network 66. As such, the server device 64 may be able to communicate with other server devices 64 or with the remote computing device 62 through the communications network, as illustrated in FIG. 4. Likewise, the remote computing device 62 may be able to communicate with other remote computing device 62, the server device 64, or the lifts 22 (e.g., with one or more of the lift control modules 24 associated with the lifts 22 of the lift system 20) through the communications network 66. As noted above, the connection to the communications network 66 may be wired or wireless. Thus, the remote computing device 62, the server device 64, and the lifts 22 (e.g., the lift control modules 24 of the lifts) may include the appropriate components to establish a wired or a wireless connection.

The computer program of embodiments of the present invention comprises a plurality of code segments executable by a computing device for performing the steps of the method of the present invention. The computer program, system, and method of embodiments of the present invention may be implemented in hardware, software, firmware, or combinations thereof using a remote control system 60, which broadly comprises (as illustrated in FIG. 4) one or more of the lifts 22 of the lift system 20 (including the lift control module 24 as was previously described), one or more remote computing devices 62, server devices 64, and a communications network 66.

The computer program of the present invention may run on the remote computing device 62, on one or more of the lifts 22 (e.g., on a lift control module 24), and/or on one or more server devices 64. In some embodiments, a first portion of the program, code, or instructions may execute on the remote computing device 62, while a second portion of the program, code, or instructions may execute on the lift 22 (e.g., on a lift control module 24). In some embodiments, other portions of the program, code, or instructions may execute on server device 64 as well. The various functions, actions, and/or calculations described herein as being performed by or using the computer program may actually be performed by one or more computers, processors, or other computational devices, such as the remote computing device 62, the lifts 22 (e.g., lift control modules 24), and/or server device 64, independently or cooperatively executing portions of the computer program.

In certain embodiments of the present invention, the computer program may be embodied in a stand-alone program downloaded on a user's remote computing device 62 and/or on one or more of the lifts 22 (e.g., on one or more of lift control modules 24). In other embodiments, portions of the computer program may be embodied in a web-accessible program that is accessible by the user's remote computing device 62 via the communications network 66. For the stand-alone program, a downloadable version of the computer program may be stored, at least in part, on the server device 64. A user can download at least a portion of the computer program onto the user's remote computing device 62 and/or onto the lifts 22 (e.g., on one or more of lift control modules 24) via the communications network 66. In such embodiments of the present invention, the computer program may be in the form an "application," such as an "app" for a mobile device. After the computer program has been downloaded, the program can be installed on the remote computing device 62 and/or onto the lifts 22 (e.g., on one or more of lift control modules 24) in an executable format. The executable form of the computer program permits the user to access embodiments of the present invention via a mobile "app" or website. For the web-accessible computer program, the user may simply access the computer program via the communications network 66 (e.g., the Internet). As noted above, portions of the computer program may be downloaded onto the lift control module 24 for installation in an executable format. Similarly, the lift control module 24 may, in some embodiments, access and implement portions of the computer program through a website (i.e., a web-accessible computer program).

Once the user has access to the computer program, i.e., via the computer program installed on a user's remote computing device 62 or via the web, certain embodiments may provide for users to create user accounts. To create a user account, users may be required to enter, or have entered, various pieces of identification information, such as email address, name, home address, date of birth, or the like. In addition, the user may be required to enter or will otherwise be provided with a username and password, which may be required for the user to login to the user's account and access the computer program. All information entered by the user is received, via the communications network 66, and may be stored on the server device 64 or associated database. The user's account information may also be stored on the memory elements associated with the user's remote computing device 62. Regardless, once the user has created the user account, the user can access the computer program of embodiments of the present invention to remotely control one or more of the lifts 22 of the lift system 20 via the remote computing device 62, as will be discussed in more detail below.

Operation

In operation, a user can implement the user's remote computing device 62 to control the functionality of one or more lifts 22 of the lift system 20. In more detail, each of the lifts 22 of the lift system 20 may include a lift control system (as previously described), which is configured to directly control the operation of its associated lift 22. For instance, such operation may include raising, lowering, and parking the carriage assembly 34. Prior to embodiments of the present invention, the lift control system of a lift 22 was generally configured to receive instructions from a user only through the lift control module 24, which is integrated directly with the lift 22. Contrastingly, embodiments of the present invention allow for users to control the operation of the lifts 22 via a user's remote computing device 62.

In more detail, once a user has downloaded and installed the computer program onto the user's remote computing device 62, and once the computer program has been installed on the lift control module 24, embodiments of the present invention provide for the user to remotely control the operations of the lifts 22 of the lift system 20 with the user's remote computing device 62. Alternatively, as previously noted, some embodiments may allow users to access a web-accessible version of the computer program via the communications network 66 (i.e., over the Internet). To begin operation, the user may be required to first pair the user's remote computing device 62 with a lift control module 24 of the lifts 22 included within the lift system 20. As used herein, the term "pair" or "pairing" is defined as a data communication link between two devices over an established connection, such as the remote computing device 62 and the lift control module 24. Such pairing may, in some embodiments, be wireless (e.g., via WiFi™ or Bluetooth™).

To accomplish such a pairing, the user may first execute the computer program stored on the lift control module 24. In some embodiments, a button/icon will appear on the lift control module's 24 GUI requesting confirmation as to whether the user wants to pair a remote computing device 62 with the lift control module 24. For instance, as illustrated in FIG. 5, the button/icon may graphically present the phrase "Pair Device." Once the user selects the "Pair Device" button/icon, the lift control module 24 may display a verification code on the lift control module's 24 GUI. Such a verification code may comprise a Quality Response (QR) code (as illustrated in FIG. 6), a bar code, an alphanumerical code, or the like. Thereafter, the lift control module 24 begins to search for an available remote computing device 62 with which to pair.

At such time, the user may execute the computer program on the user's remote computing device 62. In some embodiments, a button/icon will appear on the remote computing device's 62 GUI requesting confirmation as to whether the user intends to pair the user's remote computing device 62 with a lift control module 24. For instance, as illustrated in FIG. 7, a button/icon may graphically present the phrase "Pair Lift Control" on the GUI of the user's remote computing device 62. Once the user has selected the "Pair Lift Control" button/icon, the remote computing device 62 will request for the user to enter a verification code. As described above, the verification code provided by the lift control module 24 may be a QR code or a bar code. In such embodiments, the user can use the optical device (e.g., the camera) of the user's remote computing device 62 to capture the image/information from the displayed verification code. For instance, the user may be required to scan the QR codes with the camera from the user's remote computing device 62. In other embodiments, such as when the verification code is an alphanumeric code, the user may be required to manually enter the verification code using the remote computing device's 62 user control interface.

Once the user has input the verification code, and the computer program verifies the verification codes as being authentic, the remote computing device 62 is made available for paring, and is paired, with the lift control module 24. Such a pairing is maintained via the communications network 66, with such a network perhaps preferably comprising WiFi™ or Bluetooth™ networks. In some embodiments of the present invention, only one remote computing device 24 may be paired with the lift control module 24 at any one time. As such, in certain embodiments, should a user attempt to pair a second remote computing device 62 with the lift control module 24 while a first remote computing device 62 is already paired, the first computing device 62 may be automatically disconnected from its pairing with the lift control module 24. In alternative embodiments, the second remote computing device's 62 pairing attempt may be rejected, and the lift control module 24 will maintain its pairing with the first remote computing device 62.

After the user's remote computing device 62 is properly paired with the lift control module 24, the user may be required to verify that the user is ready to begin operation of the lifts 22. As such, the lift control module 24 may display a button/icon, via the GUI, requesting confirmation that the user wants to being controlling the lifts 22 remotely. For instance, the button/icon may display “Enable Remote Lift Control” or simply “Enable,” as illustrated in FIG. 8. Once the user selects the “Enable” button/icon on the lift control module 24, the GUI from the user’s remote computing device 62 may also activate an “Enable Remote Lift Control” or simply an “Enable” button/icon for presentation, as illustrated in FIG. 9. To control operation of the lifts 22 of the lift system 20, the user may be required to select the “Enable” button/icon on the user’s remote computing device 62 within a predetermined confirmation period. In some embodiments, the predetermined confirmation period may be 5 seconds, 10 seconds, 15 seconds, 30 seconds, or more. If the user fails to select the “Enable” button/icon on the user’s remote computing device 62 within the predetermined confirmation period, the “Enable” button/icon on the user’s remote computing device 62 will be disabled. To re-activate the “Enable” button/icon on the user’s remote computing device 62 for selection, the user may be required to re-select the “Enable” button/icon on the lift control module 24. Thereafter, the user will again be required to select the “Enable” button/icon on the user’s remote computing device 62 within the predetermined confirmation period.

Once the user selects the “Enable” button/icon on the user’s remote computing device 62 within the predetermined confirmation period, the user will be able to control the operation of one or more of the lifts 22 of the lift system 20 from the user’s remote computing device 62. It should be understood that in some embodiments, the user will be required to continuously select (i.e., hold down) the “Enable” button/icon on the user’s remote computing device during control of the lifts 22. In such embodiments, should the user fail to hold down the “Enable” button/icon on the user’s remote computing device 62, the “Enable” button/icon on the user’s remote computing device 62 will be disabled and the user’s remote computing device 62 will no longer be capable of controlling the lifts 22. Re-activation of the “Enable” button/icon on the user’s remote computing device 62 may be performed by re-selecting the “Enable” button/icon on the lift control module 24, as previously described. In some embodiments, if the user stops holding down the “Enable” button/icon, the user may be given a predetermined grace period within which the user can re-select the “Enable” button/icon before the user must re-select the “Enable” button/icon on the lift control module 24. In some embodiments, the predetermined grace period may be the same as the predetermined confirmation period, e.g., 5 seconds, 10 seconds, 15 seconds, 30 seconds, or the like.

For purposes of controlling the lifts 22 of the lift system 20, embodiments of the present invention provide for the GUI of the user’s remote computing device 62 to further display (in addition to the “Enable” button/icons) various command buttons/icons for controlling the lifts 22. For instance, as illustrated in FIG. 9, the GUI may present a “Raise” button/icon for raising the lifts 22, a “Lower” button/icon for lowering the lifts 22, and/or a “Park” button/icon for placing the lifts 22 in a secure, parked position. To perform an operation of the lifts 22, certain embodiments of the present invention require that the user simultaneously select the “Enable” button/icon and a command button/icon. For instance, if the user intends to cause the lifts 22 of the lift system 20 to raise, the user may be required simultaneously select the “Enable” button/icon and the “Raise” button/icon. Such a requirement reduces the opportunity for inadvertent operation of the lifts 22 because the user is required to simultaneously select two separate buttons on the user’s remote computing device 62, instead of simply selecting a single button/icon. It should be understood that embodiments of the present invention may include other command button/icons for performing other operations of the lifts 22 of the lift system 20. Given the above, embodiments of the present invention provide for a user to perform generally any operation of the lifts 22 of the lift system 20 from the user’s remote computing device 62 as the user could perform with the lift control module 24.

It should also be understood that when the user pairs the remote computing device 62 with the lift control module 24, the user may be permitted to control each of the lifts 22 that were include in the lift system 20 associated with the lift control module 24. For instance, if the lift system 20 includes four individual lifts 20, the remote computing device 62 may be configured to simultaneously control the operation of each of the four lifts 22, such that the four lifts 22 can be instructed to raise, lower, or park, all in unison. Alternatively, if the lift control module 24 is only associated with a single lift 22 of a lift system 20, then the remote computing device 62, may only be configured to control the operation of the single lift 22. Nevertheless, embodiments of the present invention may also provide for the remote computing device 62 to selectively control any of the lifts 22 in the lift system 20. For instance, if a lift control module 24 is associated with a lift system 20 that includes four individual lifts 22, embodiments of the present invention may provide for the user to select one or more of the four lifts 22 to independently control. Such embodiments may be facilitated, for instance, by the GUI of the user’s remote computing device 62 displaying a graphical representation of the four lifts 22. For example, the GUI may graphically depict a representation of four lifts 22 surrounding a vehicle. From the GUI, the user may select any one or more of the lifts 22. Upon selecting any one or more of the lifts 22, embodiments of the present invention may provide for the user to control the operation of those one or more lifts 22 that were associated with the graphically-depicted lifts.

In view of the above, embodiments of the present invention include a method for remotely controlling a vehicle lift 22 of a lift system 20. The method may comprise the initial step of providing an instruction to the lift control module 24 to pair with a remote computing device 62. An additional step may include providing an instruction to the remote computing device 62 to pair with the lift control module 24. An additional step may include capturing a validation code with the remote computing device 62. An additional step may include providing an instruction to the remote computing device 62 to enable remote control of the vehicle lift 22. A further step may include controlling the vehicle lift 22 with the remote computing device 62.

A further embodiment of the present invention may include an additional method for controlling a vehicle lift 22. The method may include the initial step of receiving an instruction to pair with the vehicle lift 22. An additional step may include obtaining a validation code. An additional step may include pairing with the vehicle lift 22 by creating a communications link with the vehicle lift 22. An additional step may include receiving an instruction to enable remote operation of the vehicle lift 22. An additional step may include determining if a confirmation period elapses without receiving the instruction to enable remote operation of the vehicle lift 22. Upon determining that the confirmation period has elapsed without receiving the instruction to enable remote operation of the vehicle lift 22, a further step may include disabling the communications link with the vehicle lift 22.

As previously described, certain embodiments of the present invention provide for only one remote computing device 62 to be paired with the lift control module 24 at any one time. For each remote computing device that is to be paired with the lift control module 24, the user may be required to first select the "Pair Device" button on the lift control module's 24 GUI, and the user must then capture the verification code presented by the lift control module 24. Upon attempting to pair a new remote computing device 62, certain embodiments provide for any remote computing device 62 that was previously paired to be un-paired prior to the new remote computing device 62 being paired.

Nevertheless, embodiments of the present invention provide for multiple remote computing devices 62 to be otherwise associated with the lift control module 24 in an un-paired manner for purposes of general data transfer. For instance, a plurality of remote computing devices 62 may be registered with a lift control module 24 of any of the lifts 22 of the lift system 20, such that the lift control module 24 can provide lift data to such remote computing devices 62. Such lift data may comprise various types of information related to the lifts 22 of the lift system 20. Such lift data may comprise lift usage data, lift maintenance data, lift operational data, or the like. Such lift data can be regularly gathered by the lift control module 24 and transmitted to the plurality of remote computing devices 62 for use in diagnosing lift problems, notifying lift users of maintenance needs, and/or warning lift owners of improper lift operations. For example, embodiments may provide users with maintenance alerts to remind the user when the lifts 22 or the lift control module 24 is in need of maintenance. Such alerts may be based, at least in part, on the lift data that is collected and stored. Lift data may include, for example, energy use, energy levels, lift height, lift velocity, lifting load weights, lifting frequencies, object locations, or the like. As an illustrative example, in some embodiments, the lift control module 24 may send out an alert to each of the associated remote computing devices 62 if the battery charge of any of the batteries 42 associated with any one of the lifts 22 falls below a predefined minimum value. As such, each of the users associated with such remote computing devices can be alerted that the battery 42 is not in an operational state and must be recharged or replaced. Such data transfer may be provided over the communications network 66 (e.g., WiFi™ or Bluetooth™), and may be in the form of a text alert, email, or other messaging format.

Finally, in certain further embodiments of the present invention, none of the lifts 22 of the lift system 20 may include internal processors as part of their lift control systems. In such embodiments, the only processor used to carry out the operations of the lifts 22 (e.g., raising, lowering, etc.) may be the processors included within the remote computing devices 62. As such, the remote computing devices 62 may directly send command functions to components (e.g., hydraulic power system components) of the lifts 22 to carry out operations of the lifts 22. Similarly, the lifts 22 may directly send lift data to the remote computing device 62, which may be necessary for controlling the lifts 22. For instance, the lift data may include operating data and/or senor data (e.g., lift position, lift height, load weight, raising/lowering speed, or the like), with which the remote computing device 62 analyzes before providing command functions to the lifts 22. In some embodiments, however, the lifts may have at least one internal processor configured to facilitate communication between the lifts 22 and the remote computing device 62. Furthermore, in some embodiments, only the lift control module 24 of one or more of the lifts 22 of the lift system 20 may include a processor for carrying out the operations of the lifts 22

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A remote control system for remotely controlling one or more vehicle lifts, said remote control system comprising:
- a lift control module associated with the one or more vehicle lifts, said lift control module including—
  - a graphic display configured to present a graphical user interface (GUI),
  - a processor,
  - a non-transitory computer-readable storage medium with a computer program stored thereon, wherein the computer program is configured to instruct said lift control module processor to perform the following steps:
    - generate a GUI on the graphic display of said lift control module,
    - present, via the lift control module GUI, a pairing icon,
    - receive information indicative of an instruction to pair said lift control module with a remote computing device, wherein the information indicative of an instruction to pair includes a user activating the pairing icon of the lift control module GUI,
    - present, via the lift control module GUI, a validation code,
    - present, via the lift control module GUI, an enable icon, wherein activation of the enable icon of the lift control module GUI is indicative of a user requesting to remotely control the one or more vehicle lifts with said remote computing device;
- said remote computing device including—
  - a graphic display configured to display a GUI,
  - a processor,
  - a non-transitory computer-readable storage medium with a computer program stored thereon, wherein the computer program is configured to instruct said remote computing device processor to perform the following steps:
    - generate a GUI on the graphic display of said remote computing device,
    - present, via the remote computing device GUI, a pairing icon,
    - receive information indicative of an instruction to pair said remote computing device with said lift control module, wherein the information indicative of an instruction to pair includes the user activating the pairing icon of the remote computing device GUI,
    - receive the validation code presented by said lift control module,
    - wherein upon validating the received validation code, said remote computing device is configured to be paired with said lift control module,
    - present, via the remote computing device GUI, an enable icon, wherein activation of the enable icon of the remote computing device GUI is indicative of the user requesting to control the one or more vehicle lifts with said remote computing device, present, via the remote computing device GUI, a command icon, wherein activation of the command icon of the remote computing device GUI is indicative of the user providing an instruction to control operation of the one or more vehicle lifts with said remote computing device, controlling, via said remote computing device, operation of the one or more vehicle lifts.

2. The remote control system of claim 1, wherein said lift control module comprises a computing device that is integral with a lift of the one or more vehicle lifts.

3. The remote control system of claim 1, wherein said remote computing device comprises a smartphone or a tablet.

4. The remote control system of claim 1, wherein said remote computing device is configured to be paired in wireless data communication with said lift control module.

5. The remote control system of claim 1, wherein said lift control module is configured to be paired with only one remote computing device at any one time.

6. The remote control system of claim 1, wherein the validation code is a quality response (QR) code.

7. The remote control system of claim 1, wherein said remote computing device includes an optical device for capturing the validation code.

8. The remote control system of claim 1, wherein upon said remote computing device being paired with said lift control module, said remote computing device is configured to remotely control the one or more vehicle lifts.

9. The remote control system of claim 8, wherein the enable icon of said lift control module GUI must be selected before said remote computing device can remotely control the one or more vehicle lifts.

10. The remote control system of claim 1, wherein said remote computing device is configured to remotely control the one or more lifts only if the enable icon is simultaneously selected along with one or more of the command icons.

11. The remote control system of claim 1, wherein upon the enable icon on said remote computing device not being selected for a predetermined confirmation period, said remote computing device is disabled from remotely controlling the one or more lifts.

12. The remote control system of claim 11, wherein the predetermined confirmation period is 5 seconds.

13. A method for remotely controlling a vehicle lift, said method comprising the steps of:

providing an instruction to a lift control module to pair with a remote computing device;

providing an instruction to the remote computing device to pair with the lift control module;

capturing a validation code with the remote computing device;

pairing the remote computing device with the lift control module, wherein after said pairing step, the remote computing device is not permitted to remotely control the vehicle lift until the lift control module and the remote computing device are each enabled for remote control;

providing an instruction to the lift control module to enable remote control of the vehicle lift by the remote computing device;

providing an instruction to the remote computing device to enable remote control of the vehicle lift, wherein if the instruction to enable remote control is not provided to the remote computing device within a confirmation period, the remote computing device is prevented from being enabled for remote control of the vehicle lift; and providing a command to the remote computing device so as to control an operation of the vehicle lift with the remote computing device.

14. The method of claim 13, wherein the step of capturing a validation code comprises capturing an image of the validation code with the remote computing device, and wherein the validation code is a quality response (QR) code.

15. The method of claim 13, wherein the step of providing a command to control the operation of the vehicle lift comprises simultaneously selecting an enable icon and a command icon on the remote computing device.

16. The method of claim 15, wherein upon the enable icon on the remote computing device not being selected for a predetermined confirmation period, the remote computing device is disabled from controlling the one or more lifts unless the enable icon on the lift control module is reselected.

17. A non-transitory computer readable storage medium with a computer program stored thereon for controlling a vehicle lift, wherein the computer program is configured to instruct a processor to perform the following steps:

receive an instruction to pair with the vehicle lift;

obtain a validation code;

pair with the vehicle lift by creating a communications link with the vehicle lift;

activate an enable icon on a graphical user interface (GUI), wherein a selection of the enable icon is indicative of an instruction to enable remote operation of the vehicle lift;

determine if a confirmation period elapses without receiving the instruction to enable remote operation of the vehicle lift;

upon determining that the confirmation period has elapsed without receiving the instruction to enable remote operation of the vehicle lift, disabling the enable icon on the GUI;

re-activate the enable icon on the GUI;

receive, via selection of the re-activated enable icon, the instruction to enable remote operation of the vehicle lift;

receive a command to control an operation of the vehicle lift; and send an instruction to the vehicle lift to control the operation of the vehicle lift.

18. The non-transitory computer readable storage medium of claim 17, wherein the non-transitory computer readable storage medium is included with a remote computing device comprising a smartphone or a tablet.

19. The non-transitory computer readable storage medium of claim 17, wherein the validation code is a quality resource (QR) code.

* * * * *